Patented Dec. 25, 1934

1,985,750

UNITED STATES PATENT OFFICE 1,985,750

PREPARATION OF ACETIC ACID

Edward Boaden Thomas, Walter Henry Groombridge, and Horace Finningley Oxley, Spondon, near Derby, England, assignors to Celanese Corporation of America, a corporation of Delaware No Drawing. Application September 15, 1931, Serial No. 563,006. In Great Britain November 26, 1930

8 Claims. (Cl. 260—116)

The invention relates to the manufacture of acetic acid by the oxidation of acetaldehyde.

Compounds of manganese have long been known to catalyze the oxidation of acetaldehyde to acetic acid, and manganous acetate in particular has found a wide application as a catalyst for this reaction particularly when liquid aldehyde is to be oxidized.

According to the invention we employ as catalysts manganic salts, and especially manganic acetate. These salts offer several advantages over the manganese compounds heretofore employed. For instance it has been found in the oxidation of liquid aldehyde that the compounds heretofore employed, and particularly manganous acetate need a considerable activation period in the reaction mixture before acquiring their catalytic power; delay is thus caused in the start of the reaction. Not only is this inconvenient but it may also prove dangerous owing to the accumulation during this time of explosive compounds, for example peracetic acid. When however manganic salts and particularly manganic acetate are employed, this activation period is avoided or very considerably reduced.

In performing the invention we preferably oxidize the aldehyde in the liquid form. The manganic salts may be added to the aldehyde to be oxidized in any convenient way. Conveniently they may be added in solution in solvents such as acetic acid. The manganic salts and/or such solutions thereof may of course be prepared in any convenient way. For instance manganic acetate for use in the invention may conveniently be prepared by the oxidation of manganous acetate with potassium permanganate in acetic acid solution. For this purpose we prefer to use a fairly concentrated acetic acid for example between 96–100%. The brown solution so obtained contains manganic acetate and an acid potassium acetate, the latter salt having a comparatively low solubility in acetic acid. The solution, if desired after the partial or complete separation of the acid potassium acetate for example by recrystallization, may be introduced into the reaction vessel, preferably at such a temperature that all the salts present are in solution. Usually moderate temperatures, for example, between 30° and 50° are advantageous. In passing we would remark that manganic acetate can be introduced into the reaction vessel together with far less acetic acid than is required to keep a manganous compound such as manganous acetate in a suitably fine catalytically active form.

The oxidation of the liquid aldehyde may be performed at any convenient temperature. We prefer however to use temperatures between 0° and 20° when working with pure or nearly pure oxygen. When a mixture containing a large proportion of inert gas is used, for example as when employing air or the like, higher temperatures, for example up to 40° or higher may advantageously be employed. If desired the reaction mixture and/or the vapour space above the same, may be cooled initially for example to between 0° and 5°.

Any convenient pressures may be used; for instance when pure or nearly pure oxygen is employed atmospheric pressure is very satisfactory although higher pressures may be used if desired. When however the oxygen is mixed with considerable quantities of an inert gas, as in air, the use of higher pressures, for example, from 20 to 30 pounds per square inch or higher, is advantageous.

The oxygen may be either pure or mixed with inert gases as in air, and may be introduced into the liquid in any convenient way, preferably in a fine state of division. This fine state of division is preferably further promoted by stirring or otherwise agitating the reaction liquid.

The catalyst may be recovered in any convenient way. For example from the liquor remaining after removing the bulk of the acetic acid by distillation or in any other convenient way, the acid potassium acetate may be separated for example by crystallization and the resulting liquor, containing all or nearly all of the manganese in the form of manganic acetate may be further concentrated and the manganic acetate crystallized out; alternatively if desired the liquor, preferably after separation of the potassium salt, may be returned at once to the reaction vessel, thus making possible the re-employment of the catalyst in a continuous cycle.

Example

To 100 parts by weight of 96% acetic acid are added 6 parts of potassium permanganate followed by 28 parts of manganous acetate which has previously been dried at 100°; during the addition the mixture is well stirred. The solution so formed, comprising manganic acetate and an acid potassium acetate dissolved in acetic acid, is heated to about 50° C. and while still warm is introduced into the reaction vessel containing acetaldehyde in such quantity that the reaction mixture contains ¼ to 1% manganic acetate. Air is passed into the mixture, preferably in the form of fine bubbles, and the mixture is kept at about 10°–20° C. for 10–30 minutes. The temperature is then allowed to rise to 30°–40° and kept within this range until substantially all the aldehyde is oxidized.

While the invention has been described more particularly with reference to the oxidation of liquid aldehyde the invention is not limited to the use of such aldehyde but includes also the oxidation of aldehyde vapour. In cases where aldehyde vapour is to be employed the temperatures and conditions heretofore employed in the catalytic oxidation of aldehyde vapour may usefully be employed for the purposes of the invention.

What we claim and desire to secure by Letters Patent is:—

1. The manufacture of acetic acid which comprises the step of oxidizing acetaldehyde with oxygen in the presence of manganic salt initially added as such.

2. The manufacture of acetic acid which comprises the step of oxidizing acetaldehyde with oxygen in the presence of manganic acetate initially added as such.

3. The manufacture of acetic acid which comprises the steps of mixing liquid acetaldehyde with a manganic salt, as such, and oxidizing the acetaldehyde with oxygen.

4. The manufacture of acetic acid which comprises the steps of mixing liquid acetaldehyde with manganic acetate, as such, and oxidizing the acetaldehyde with oxygen.

5. The manufacture of acetic acid which comprises the steps of mixing acetaldehyde with a solution of manganic acetate, as such, in acetic acid, and oxidizing the acetaldehyde with oxygen.

6. The manufacture of acetic acid which comprises the steps of oxidizing manganous acetate in acetic acid solution with a salt of permanganic acid, mixing with acetaldehyde the solution of manganic acetate in acetic acid so produced and oxidizing the acetaldehyde with oxygen.

7. The manufacture of acetic acid which comprises the steps of oxidizing manganous acetate in acetic acid solution with a salt of permanganic acid, separating the acid potassium acetate formed, mixing with acetaldehyde the solution of manganic acetate in acetic acid so produced, and oxidizing the acetaldehyde with oxygen.

8. The manufacture of acetic acid which comprises the steps of oxidizing manganous acetate in acetic acid solution with potassium permanganate, mixing with acetaldehyde the solution of manganic acetate in acetic acid so produced and passing air through the acetaldehyde at a temperature between 30° and 40° C. and under a pressure between 20 and 30 pounds per square inch.

EDWARD BOADEN THOMAS.
WALTER HENRY GROOMBRIDGE.
HORACE FINNINGLEY OXLEY.